(12) United States Patent
Jalla

(10) Patent No.: US 11,521,287 B2
(45) Date of Patent: Dec. 6, 2022

(54) METHOD AND SYSTEM FOR OPTIMIZING SHIPPING METHODOLOGY FOR 3-DIRECTIONAL WALL PANELS

(71) Applicant: Consulting Engineers, Corp., Reston, VA (US)

(72) Inventor: Maharaj Jalla, Great Falls, VA (US)

( * ) Notice: Subject to any disclaimer, the term of this patent is extended or adjusted under 35 U.S.C. 154(b) by 364 days.

(21) Appl. No.: 16/832,729

(22) Filed: Mar. 27, 2020

(65) Prior Publication Data

US 2021/0217122 A1 Jul. 15, 2021

Related U.S. Application Data

(63) Continuation-in-part of application No. 16/742,125, filed on Jan. 14, 2020.

(51) Int. Cl.
*G06Q 50/28* (2012.01)
*G06Q 10/06* (2012.01)
*G06T 19/20* (2011.01)

(52) U.S. Cl.
CPC ....... *G06Q 50/28* (2013.01); *G06Q 10/06315* (2013.01); *G06T 19/20* (2013.01); *G06T 2210/04* (2013.01); *G06T 2219/2008* (2013.01)

(58) Field of Classification Search
CPC ............... G06T 19/20; G06T 2210/04; G06T 2219/2008; G06Q 50/28; G06Q 10/06315
See application file for complete search history.

(56) References Cited

U.S. PATENT DOCUMENTS

| | | | | |
|---|---|---|---|---|
| 2010/0024318 A1* | 2/2010 | Zhang | ..................... | G06F 30/13 52/79.5 |
| 2018/0300433 A1* | 10/2018 | Maxam | ................... | G06F 30/13 |
| 2019/0205485 A1* | 7/2019 | Rejeb Sfar | ............. | G06T 17/00 |

* cited by examiner

*Primary Examiner* — King Y Poon
*Assistant Examiner* — Vincent Peren
(74) *Attorney, Agent, or Firm* — Andrew Morabito

(57) ABSTRACT

A system comprising; analyzing a building model, wherein a set of wall panels are isolated from other assemblies; processing a first set of data associated with the coordinates of the wall panels; processing a second set of data associated with the assembly of the wall panels; creating a set of data associated with the assembly of the wall panel and the coordinates of a set of wall panel members; formulating an assembly of the wall panel, wherein the assembly is a predetermined organization of the wall panels based on the first set of data and the second set of data; calculating the assembly based on a set of limitations, wherein the limitations are based on the shipping vessel; manipulating the assembly, wherein the manipulated assembly is within the limitations of the shipping vessel; and generating a graphical representation of the manipulated assembly.

16 Claims, 9 Drawing Sheets

METHOD AND SYSTEM FOR OPTIMIZING SHIPPING METHODOLOGY FOR 3-DIRECTIONAL WALL PANELS

CROSS-REFERENCE TO RELATED APPLICATIONS

This application is a continuation-in-part (and claims the benefit of priority under 35 USC 120) of U.S. application Ser. No. 16/742,125 filed Jan. 14, 2020. The disclosure of the prior applications is considered part of (and is incorporated by reference in) the disclosure of this application.

BACKGROUND

This disclosure relates to building construction and in particular, to a method, a computer program, or a computer system for optimization of the shipping methodology of wall panels.

When framing a building, the members which make up the frame need to be shipped to the work site. The members may be shipped in containers, by truck, or various other methods of transportation. These panels need to be assembled for shipping, and typically are placed within the shipping vessel in an arbitrary order or placement which results in either lost space, difficulty sorting the members, or incorrect assembly of the members due to the inability to determine which member is which. This results in a tremendous amount of lost time and money at the construction site.

Cold formed steel members are manufactured from the roll forming machines in various lengths as per the user inputs and the member designs. Shipping or transportation of the cold formed steel members is done to construction site by shipping containers. Cold formed steel members are shipped to site in either plurality of the members assembled together to form a panel or as individual members which are then sorted on site.

In current industry practice, the bundling of the members together for shipping is not done in an organized way as different sizes and shapes of the cold formed steel members in the wall. Each assembly occupies large volume and when the materials are shipped to the site, due to the large volume of each assembly the space inside the shipping container is not utilized in most optimized way. Additionally, the assemblies require the workers to know exactly which member goes where in the assembly of the panels. This also provides for the opportunity for a member to be misplaced or lost.

It is desirable for a system or program that is able to optimize the bundling or preparing of the panels in such a way that it will occupy least volume and shipping or transportation cost and reduce the time on site to determine which panel is associated with and also assist in the assembly of the panels.

SUMMARY

In a first embodiment, the present invention is a computer method, comprising: analyzing, by at least one processor, a building model, wherein a set of wall panels are isolated from other assemblies; processing, by at least one processor, a first set of data associated with the coordinates of the wall panels; processing, by at least one processor, a second set of data associated with the assembly of the wall panels; creating, by at least one processor, a set of data associated with the assembly of the wall panel and the coordinates of a set of wall panel members; formulating, by at least one processor, an assembly of the wall panel, wherein the assembly is a predetermined organization of the wall panels based on the first set of data and the second set of data; calculating, by at least one processor, the assembly based on a set of limitations, wherein the limitations are based on the shipping vessel; manipulating, by at least one processor, the assembly, wherein the manipulated assembly is within the limitations of the shipping vessel; and generating, by at least one processor, a graphical representation of the manipulated assembly, wherein the graphical representation includes a procedure for the manipulated assembly and the wall panels.

In a second embodiment, the present invention is a computer program product for generating an assembly of a set of wall panels for shipping, the computer program product, comprising: one or more computer non-transitory readable storage media and program instructions stored on the one or more computer non-transitory readable storage media, the program instructions comprising: program instructions to analyze a building model, wherein a set of wall panels are isolated from other assemblies; program instructions to process a first set of data associated with the coordinates of the wall panels; program instructions to process a second set of data associated with the assembly of the wall panels; program instructions to create a set of data associated with the assembly of the wall panel and the coordinates of a set of wall panel members; program instructions to formulate an assembly of the wall panel, wherein the assembly is a predetermined organization of the wall panels based on the first set of data and the second set of data; program instructions to calculate the assembly based on a set of limitations, wherein the limitations are based on the shipping vessel; program instructions to manipulate the assembly, wherein the manipulated assembly is within the limitations of the shipping vessel; and program instructions to generate a graphical representation of the manipulated assembly, wherein the graphical representation includes a procedure for the manipulated assembly and the wall panels.

In a third embodiment, the present invention is a system for generating an assembly of a set of wall panels for shipping, the system, comprising: one or more computer processors, one or more computer non-transitory readable storage media, and program instructions stored on the one or more computer non-transitory readable storage media for execution by, at least one of the one or more processors, the program instructions comprising: analyzing a building model, wherein a set of wall panels are isolated from other assemblies; processing a first set of data associated with the coordinates of the wall panels; processing a second set of data associated with the assembly of the wall panels; creating a set of data associated with the assembly of the wall panel and the coordinates of a set of wall panel members; formulating an assembly of the wall panel, wherein the assembly is a predetermined organization of the wall panels based on the first set of data and the second set of data; calculating the assembly based on a set of limitations, wherein the limitations are based on the shipping vessel; manipulating the assembly, wherein the manipulated assembly is within the limitations of the shipping vessel; and generating a graphical representation of the manipulated assembly, wherein the graphical representation includes a procedure for the manipulated assembly and the wall panels.

BRIEF DESCRIPTION OF THE DRAWINGS

Referring now to the drawings in which like reference numbers represent corresponding parts throughout.

DETAILED DESCRIPTION

Figure 1:
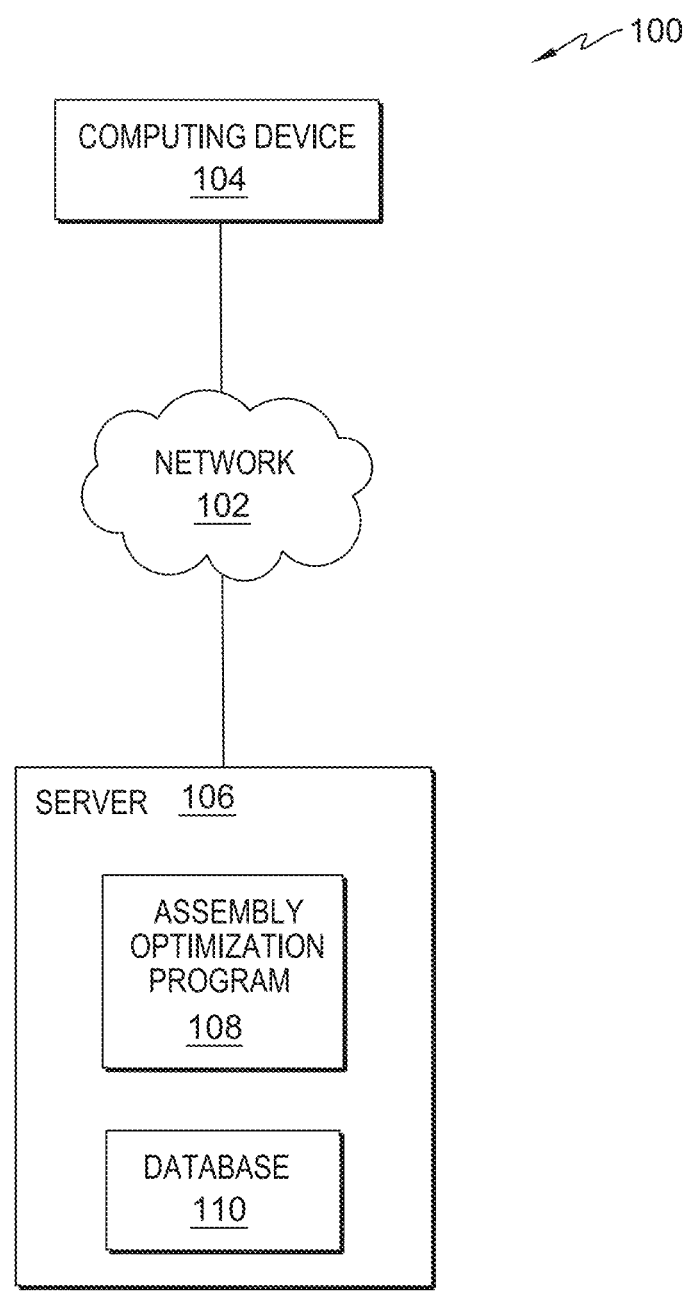
FIG. 1 depicts a block diagram depicting a computing environment, in accordance with one embodiment of the present invention.

This disclosure relates to building construction and in particular, to a method, a computer program, or a computer system for optimization of the shipping methodology of panels and the organization of the panel members.

Typically, the panels are either manufactured in a factory and ship to site or it is constructed on site construction. Pre-Engineering buildings which are one of the most popular construction methods in recent time has all the members which are pre-engineered and premanufactured in a factory controlled environment. These members are then either shipped to the site and assembled on site or assembled at the factory and then shipped in completed or semi-completed form.

Cold formed steel buildings are the one such construction material which is manufactured in factory-controlled environment. Cold formed steel wall members are generally of a "C" shape. The roll forming from the machine is done using flat steel sheet inserted in the roll forming machine and using the rollers the steel sheet is bent to desired shape as per the user input. Cold formed steel wall members have a cavity space inside the "C" shape and when shipped the cold formed steel members can utilize this shape to reduce the wasted space within the container.

In the present invention the concept of each wall panel is premanufactured and shipped to the construction site. The wall panel is manufactured to the size and specifications of the shipping vessel limitations. This produces wall panels that may be partially completed based on the shipping vessel size and weight limit.

Generally, based on the dimensions of the shipping vessel (e.g. container or truck), the maximum limit of each assembly is determined. The length of the assembly cannot be longer than the maximum shipping container length. Additionally, the height and width of the container limit the assembly size as well and are set as maximum limits on each assembly.

The present invention provides for an advantage over the present packaging and shipping techniques by utilizing a unique optimization feature where the wall panels are analyzed based on the shipping container, determined the maximum size and number of panels, and create an assembly pattern for the wall panels to fit within the shipping vessel within minimal wasted or lost space.

The present invention may be a system, a method, and/or a computer program product. The computer program product may include a computer readable storage medium (or media) having computer readable program instructions thereon for causing a processor to carry out aspects of the present invention. The present invention is used in an embodiment with cold formed steel wall members, in alternative embodiments, various other applications may exist with other type of building materials or products.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes network 102, computing device 104, and server 106. Computing environment 100 may include additional servers, computers, or other devices not shown.

Network 102 may be a local area network (LAN), a wide area network (WAN) such as the Internet, any combination thereof, or any combination of connections and protocols that can support communications between computing device 104 and server 106 in accordance with embodiments of the invention. Network 102 may include wired, wireless, or fiber optic connections.

Computing device 104 may be a management server, a web server, or any other electronic device or computing system capable of processing program instructions and receiving and sending data. In other embodiments, computing device 104 may be a laptop computer, tablet computer, netbook computer, personal computer (PC), a desktop computer, or any programmable electronic device capable of communicating with patient computing device 104 via network 102. In other embodiments, computing device 104 may be a server computing system utilizing multiple computers as a server system, such as in a cloud computing environment. In one embodiment, computing device 104 represents a computing system utilizing clustered computers and components to act as a single pool of seamless resources. Computing device 104 may include components, as depicted and described in further detail with respect to FIG. 1.

Server 106 may be a management server, a web server, or any other electronic device or computing system capable of processing program instructions and receiving and sending data. In other embodiments server 106 may be a laptop computer, tablet computer, netbook computer, personal computer (PC), a desktop computer, or any programmable electronic device capable of communicating via network 102. In one embodiment, server 106 may be a server computing system utilizing multiple computers as a server system, such as in a cloud computing environment. In one embodiment, server 106 represents a computing system utilizing clustered computers and components to act as a single pool of seamless resources. In the depicted embodiment Assembly optimization program 108 and database 110 are located on server 106. Server 106 may include components, as depicted and described in further detail with respect to FIG. 1.

Assembly optimization program 108 has the unique features to take all members of a wall group of these building panels and determine a preferred manufacturing order and bundling process to maximize the number of members which can be placed within a single shipping container. The bundling process is further simplified by determining the preferred manufacturing order so that each member that comes out of the forming machine can be assembled one after the next and the workers do not need to assembly the members in a random or more complicated order. This also further assists with the unpacking at the work site in that the members are assembled in a way the workers can easily remove the assemblies and assemble the panels in a methodical and efficient order.

In the depicted embodiment, the assembly optimization program 108 utilizes network 102 to access the computing device 104 and to communicate with database 110. In one embodiment, Assembly optimization program 108 resides on computing device 104. In other embodiments, Assembly optimization program 108 may be located on another server or computing device, provided Assembly optimization program 108 has access to database 110.

Database 110 may be a repository that may be written to and/or read by optimization program 108. Information gathered from computing device 104 and the 1-dimensional, 2-dimensional, and 3-dimensional drawings and models as well as the requirements so that the assembly drawing in one embodiment, database 110 is a database management system (DBMS) used to allow the definition, creation, querying, update, and administration of a database(s). In the depicted embodiment, database 110 resides on computing device 104. In other embodiments, database 110 resides on another server, or another computing device, provided that database 110 is accessible to optimization program 108.

Figure 2:
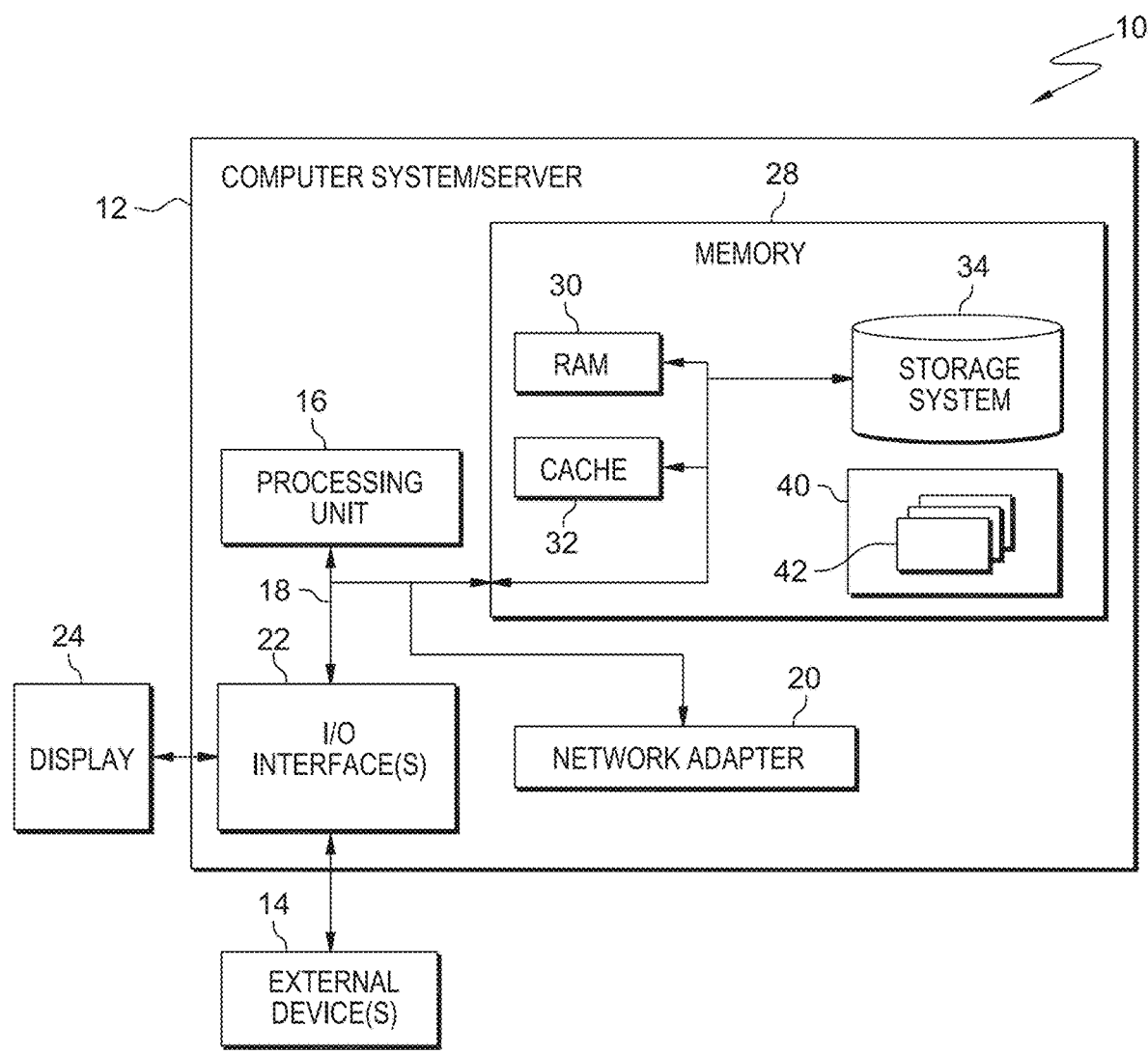
FIG. 2 depicts a block diagram depicting the internal and external components of the server and computing device of FIG. 1, in accordance with one embodiment of the present.

FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 3:
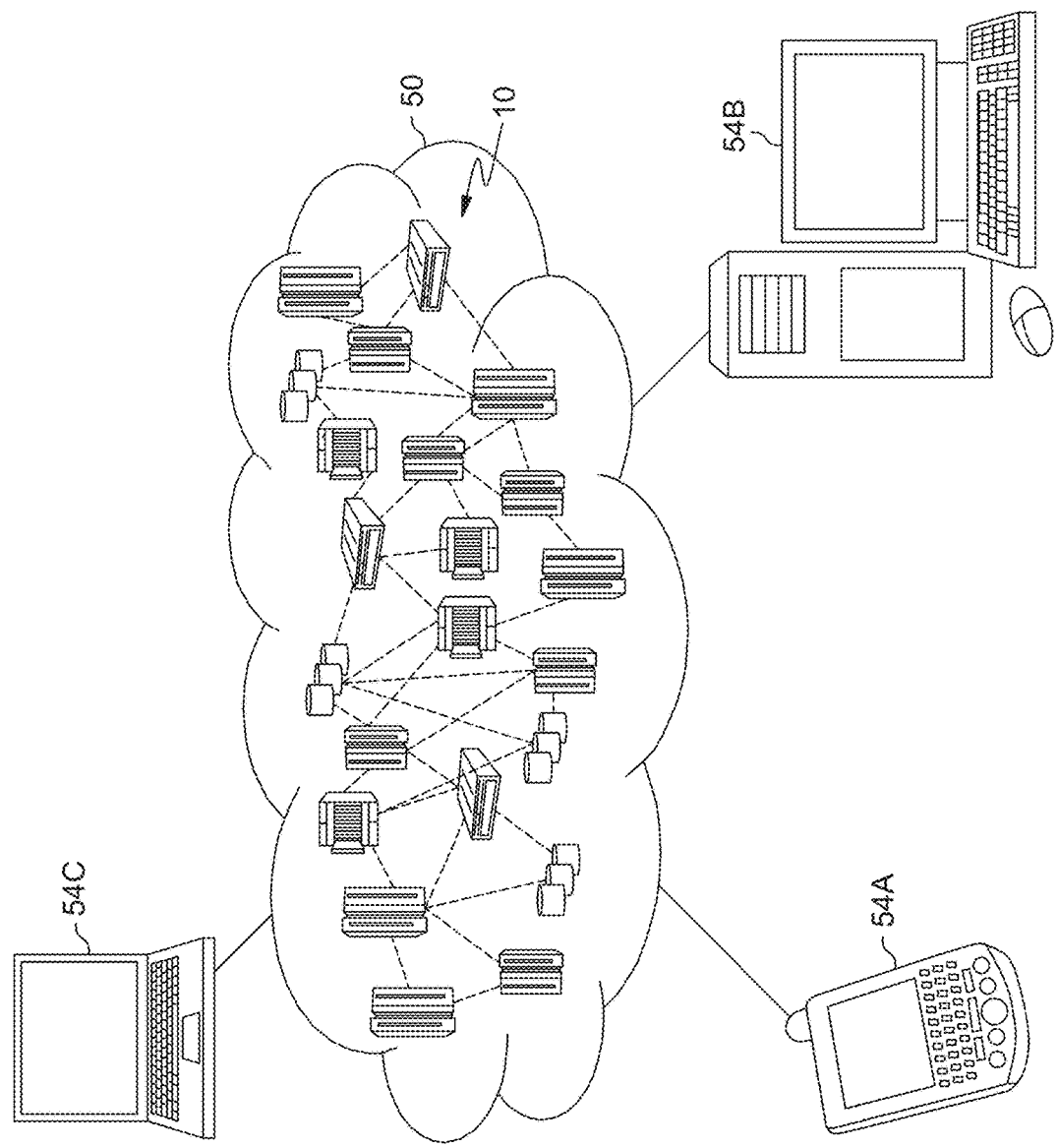
FIG. 3 depicts a cloud computing environment, in accordance with one embodiment of the present invention.

FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or additional computer systems may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Referring back to FIG. 2, the Program/utility 40 may include one or more program modules 42 that generally carry out the functions and/or methodologies of embodiments of the invention as described herein. Specifically, the program modules 42 provides for the analysis of a wall panel, the extraction of the data associated with each member, the calculation of an optimum shipping orientation, the generation of a virtual image of the members reorientation in the assembly for shipping, and then the optimization of the shipping vessel for the plurality of assemblies based on the assembly process of the frame. Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
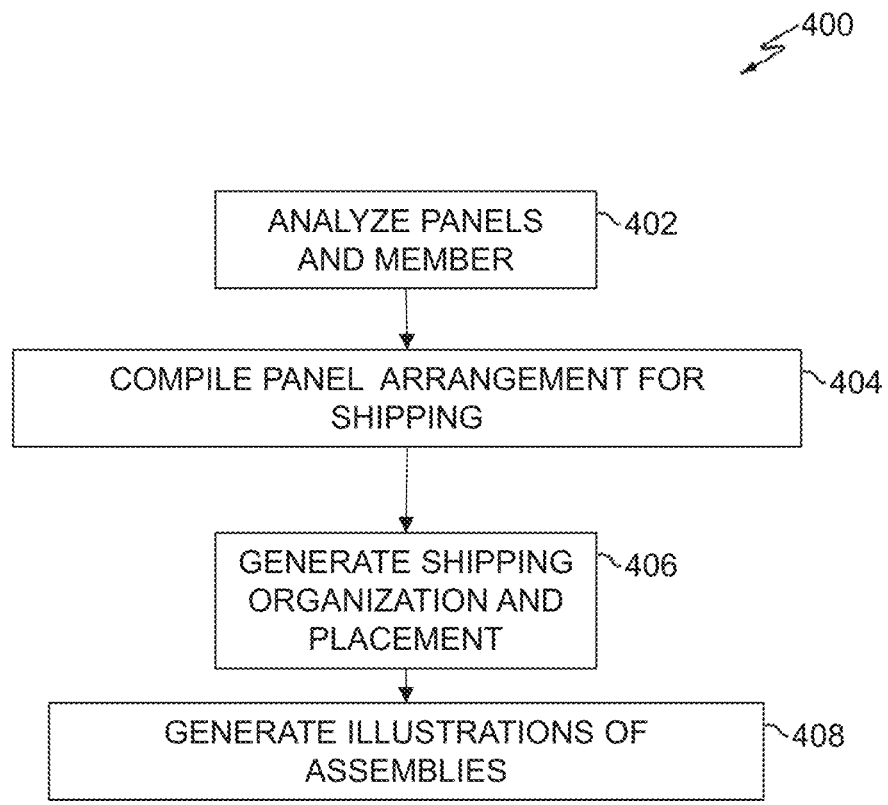
FIG. 4 depicts a flowchart of the operational steps of a method performed by a shipping optimization methodology program within the computing environment of FIG. 1, in accordance with one embodiment of the present invention.

FIG. 4 depicts flowchart 400 depicting a method according to the present invention. The method(s) and associated process(es) are now discussed, over the course of the following paragraphs, in accordance with one embodiment of the present invention. The program(s) described herein are identified based upon the application for which they are implemented in a specific embodiment of the invention.

However, it should be appreciated that any particular program nomenclature herein is used merely for convenience, and thus the invention should not be limited to use solely in any specific application identified and/or implied by such nomenclature.

In step 402, the assembly optimization program 108 analyzes the wall panel and the members. The assembly optimization program 108 receives or access the 3D model and isolates the wall panels. These panels may be, for exemplary purposes similar to the illustrations shown in FIG. 5. The wall panel in the depicted image of comprised of members 501, 502, 503, 504, and 505. The members are a top plate, bottom plate, vertical members, and nogging members. These members are connected or fastened together. The assembly optimization program 108 identifies the properties of each member within the panel and analyzes the properties of each member and the wall panel in its entirety. This includes, but is not limited to, the length, width, height, profile, and curvature of the members and the panel. In some embodiments, where weight is a factor, the assembly optimization program 108 calculates a weight of the member(s) (and the panel) based on known or calculated material properties. The assembly optimization program 108 analyzes the coordinates (X, Y, Z) of the members and wall panel to calculate the profile, thickness, and other dimensional properties of the panel.

Figure 7:
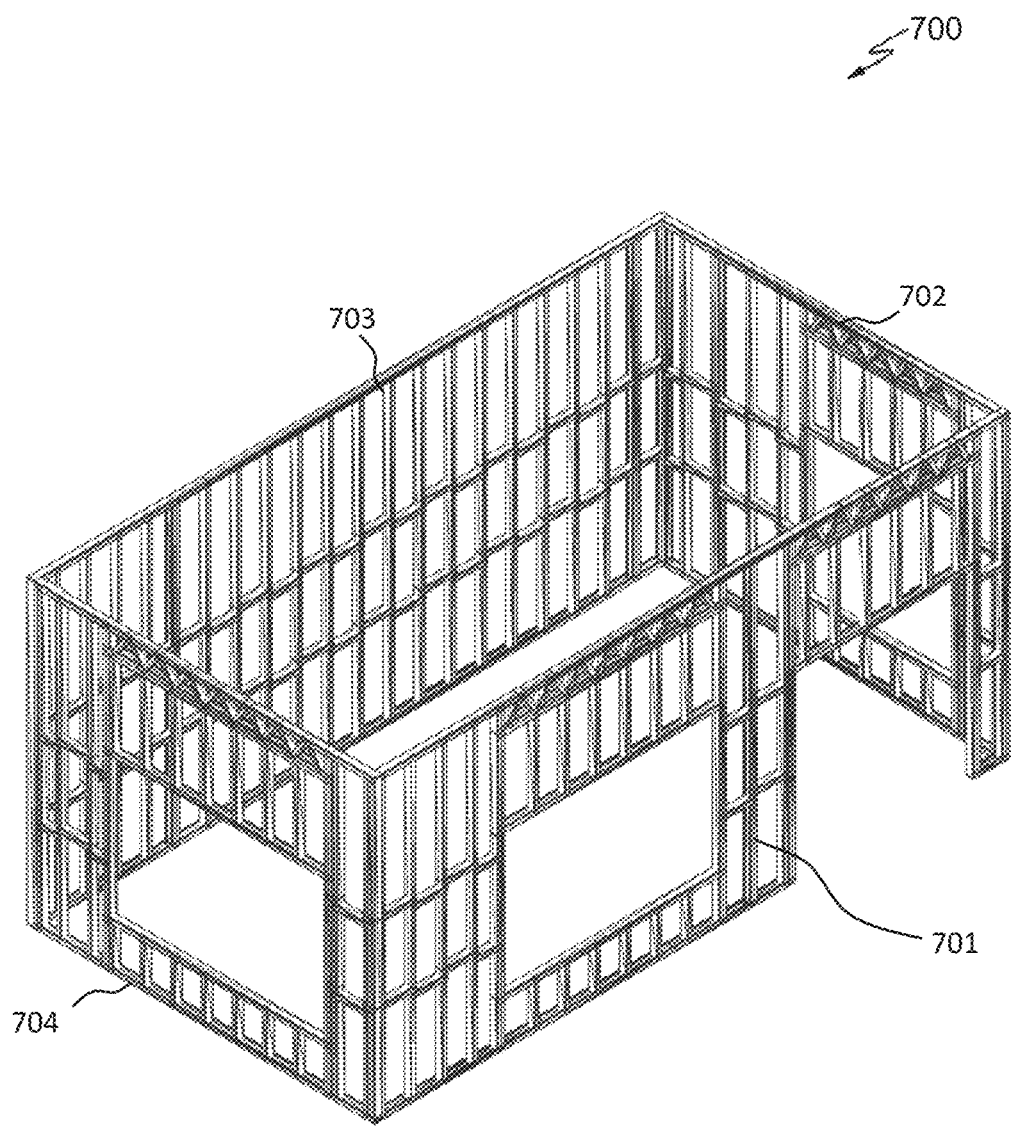
FIG. 7 depicts an illustration of an assembly, in accordance with one embodiment of the present invention.
Figure 8:
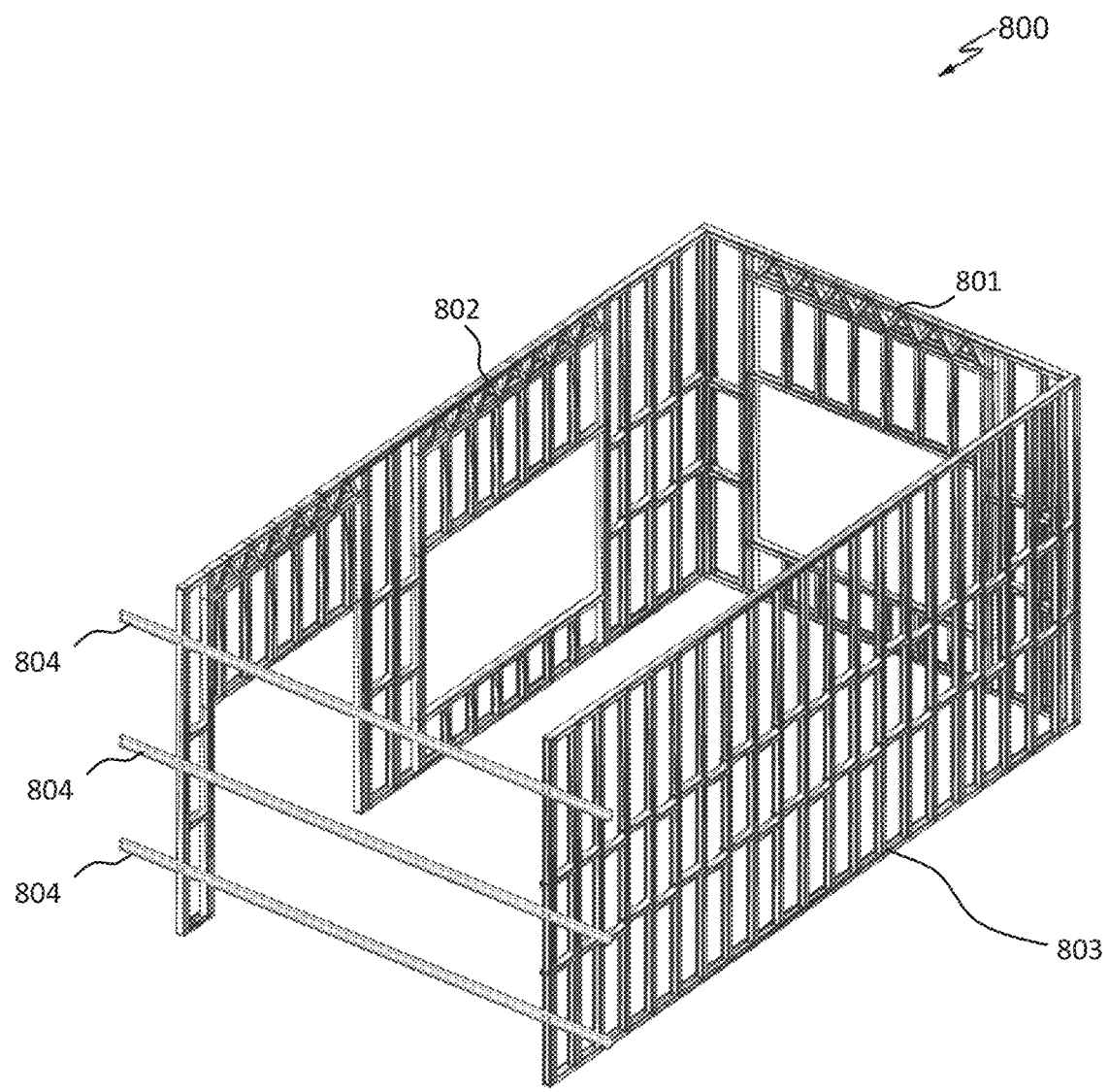
FIG. 8 depicts a side view of an assembly, in accordance with another embodiment of the present invention.

In step 404, the assembly optimization program 108 compiles the panel arrangement for shipping. The assembly optimization program 108 reviews the size limitations, and in some settings the weight limitations of the shipping vessel. The shipping container may be an intermodal freight container, or various other shipping container which are used by specific industries. The assembly optimization program 108 is able to process the construction of each wall panel, determine the maximum dimension of the construction process at each stage, compare this to the shipping vessel limitations, and determine at what stage the construction of the wall panel should be suspended so that the wall panel will fit within the shipping vessel. This may result in a wall panel have two partially constructed sections which are shipped, and the final assembly happens on site. FIG. 7 depicts an image of an assembly with wall panels 701, 702, 703, and 704. The assembly is presumably pre-manufactured as much as possible in the factory based on the limitations of the shipping carrier. In the depicted embodiment, each wall panel is structurally different based on the model of the building. FIG. 8 depicts an image of an assembly with wall panels 801, 802, and 803 with supports 804 providing structural support for the assembly 800. The depicted assembly 800 lacks a fourth wall to complete the supports based on the position and incorporation of the assembly 800 into the overall building model. The supports 804 provide the necessary support for the transportation and to keep the panels in position. In some embodiments, the location of the supports 804 is calculated based on the fastening locations of the members which the supports 804 interact with. The supports 804 are positioned to provide the maximum support, leave amount of damage to the panels or members. This assists in reducing any damage to the members, and providing the maximum strength based on the member design. In other embodiments, the supports 804 may be secured to the members through various other means. In various embodiments, the supports 804 may be positioned through various apertures or the like or diagonal across the panels or members to assist in supports the structure during transportation.

The arrangement of the panels is determined through various computer learning systems and artificial intelligence to understand the ideal or preferred assembly process of the section of the wall panel, so that the panels are arranged both in a way to decrease the space which is taken up by the assembly, due to which, the workers are able to take the panels from the assembly and easily placed on the site directly.

Through the review of the structure, the assembly optimization program 108 with the use of artificial intelligence or computer learning technology, is able to determine which panels need to be assembled first, second, third, etc. The assembly optimization program 108 calculates the order in which the assemblies are to be placed within the container, so that when removed, the first panel to be constructed and used is removed first and so on.

In step 406, assembly optimization program 108 generates the shipping organization and placement within the shipping vessel. Based on the shipping vessel size and limitations, the creates the sequence in which the assemblies are loaded into the container. The assembly optimization program 108 determines if the assembly fits within the shipping vessel. The packaging organization program 108 is able to generate an arrangement of the wall panels to fit within the container and consume the least amount of space as possible. The arrangement of the wall panels to form the assembly is determined through various computer learning systems and artificial intelligence to understand the ideal or preferred assembly process of the panel, so that the panels are arranged within the assembly to provide for the maximum use of space. The panels are arranged both in a way to decrease the space which is taken up by the assembly, but also so once the assembly is removed, the workers are able to take the panels from the assembly and easily assemble the panel. The assembly optimization program 108 is able to take the assembly of the building, disassemble the building panel (e.g. truss, joist, and wall) by panel and then reassemble to determine a desired or preferred assembly process.

Figure 6:
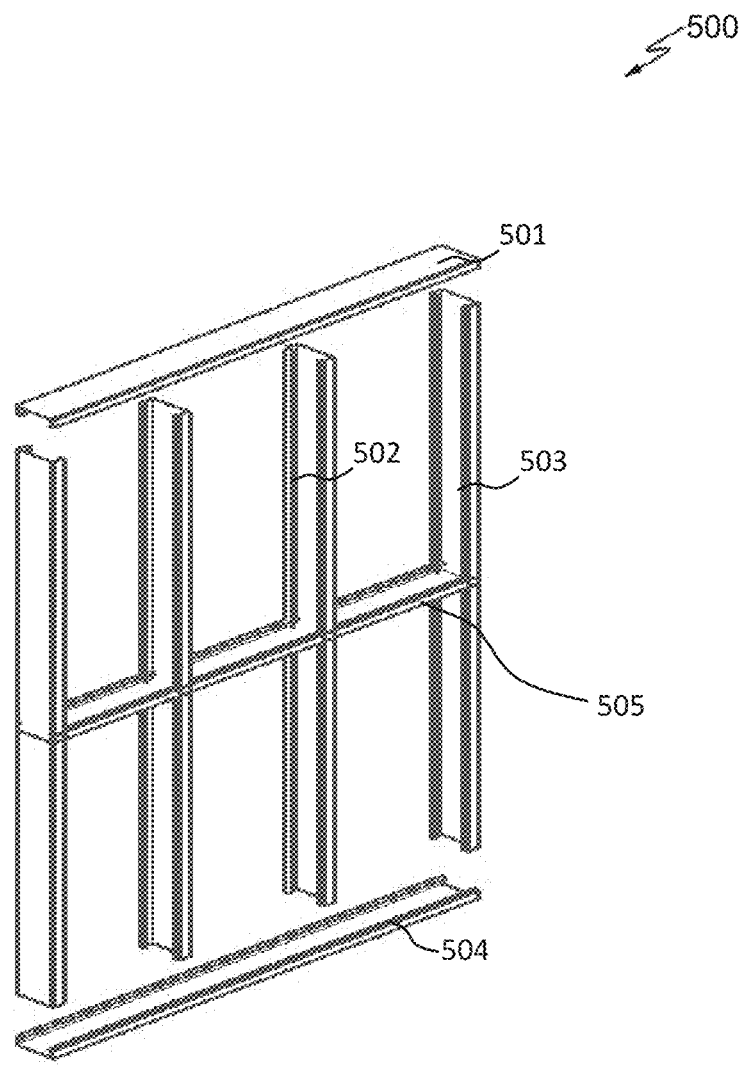
FIG. 6 depicts an illustration of a disassembled wall panel, in accordance with one embodiment of the present invention.

FIG. 6 depicts a disassembled wall panel 600. Through the disassembly process, the interfaces of the members are identified and categorized. This assembly process is then used when generating the organization of the members to limit the work required to take the packet and build the wall panel. Based on a known or calculated assembly process, the panels are ordered in the packet strategically based on this assembly process.

In some embodiments, the assembly optimization program 108 may alter the assemblies based on the overall sequence of which the assemblies are loaded into the container. This may include adjusting the overall length of the assemblies, the order of the panels within the assemblies, or possibly combining assemblies based on the benefits that the combination may produce. In some embodiments, the assembly optimization program 108 reviews the structure design and each wall panel of the structure to analyze how the structure would be constructed. This includes the assembly of the first floor, then the second floor, then the roof of a two-story building. The assembly optimization program 108 analyzes an assembly process of the entire structure and the ordering of the construction of each structure so that the wall panels which are needed to be assembled first are identified as such.

Figure 5:
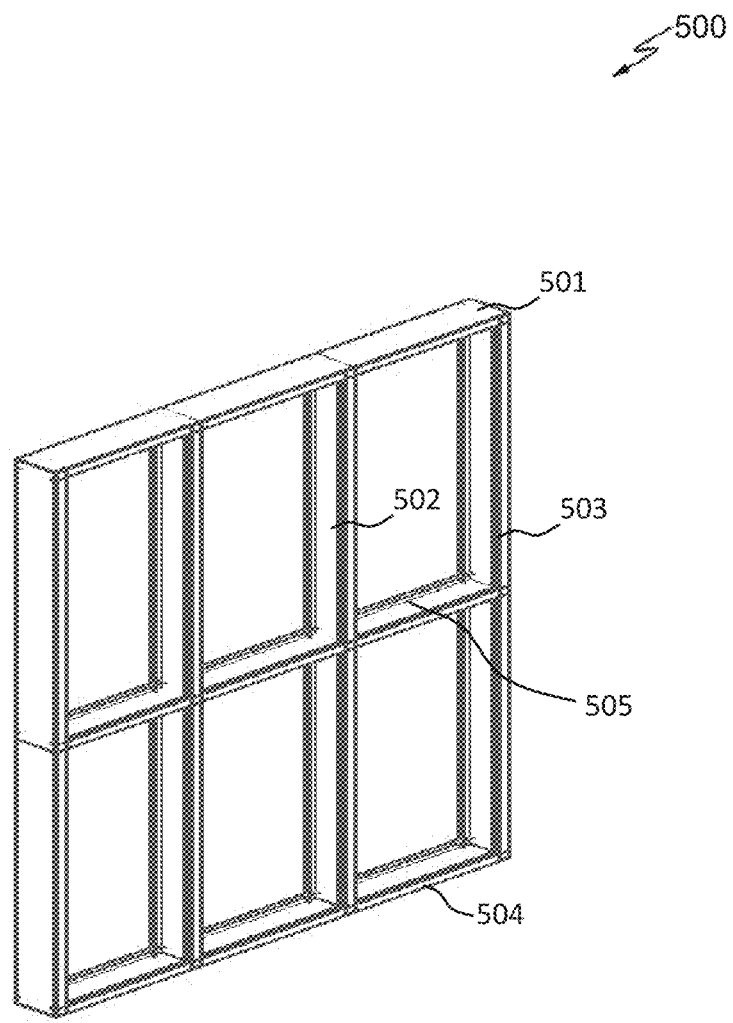
FIG. 5 depicts an illustration of an assembled wall panel, in accordance with one embodiment of the present invention.

In step 408, assembly optimization program 108 generates drawings or illustrations of assembly and the placement of the assemblies within the shipping vessel. The assembly optimization program 108 creates the drawing for each assembly to show the position of each panel within the assembly. The assembly optimization program 108 creates the drawings which show the view of the container from various perspectives to show the location of each assembly inside the container such that the maximum space is occupied in the container and there is minimum open space in the container. FIGS. 5 and 6 show illustrations of a wall panel 500 comprised of members 501-505. The assembly optimization program 108 is able to analyze each of the members, disassembly the panel, and understand the order in which the members are assembled together to form the panel. Based on this understanding the assembly optimization program 108 is able to determine a preferred order of the assemblies so that the panels when taken from the assembly are able to be assembled in the desired order.

Figure 9:
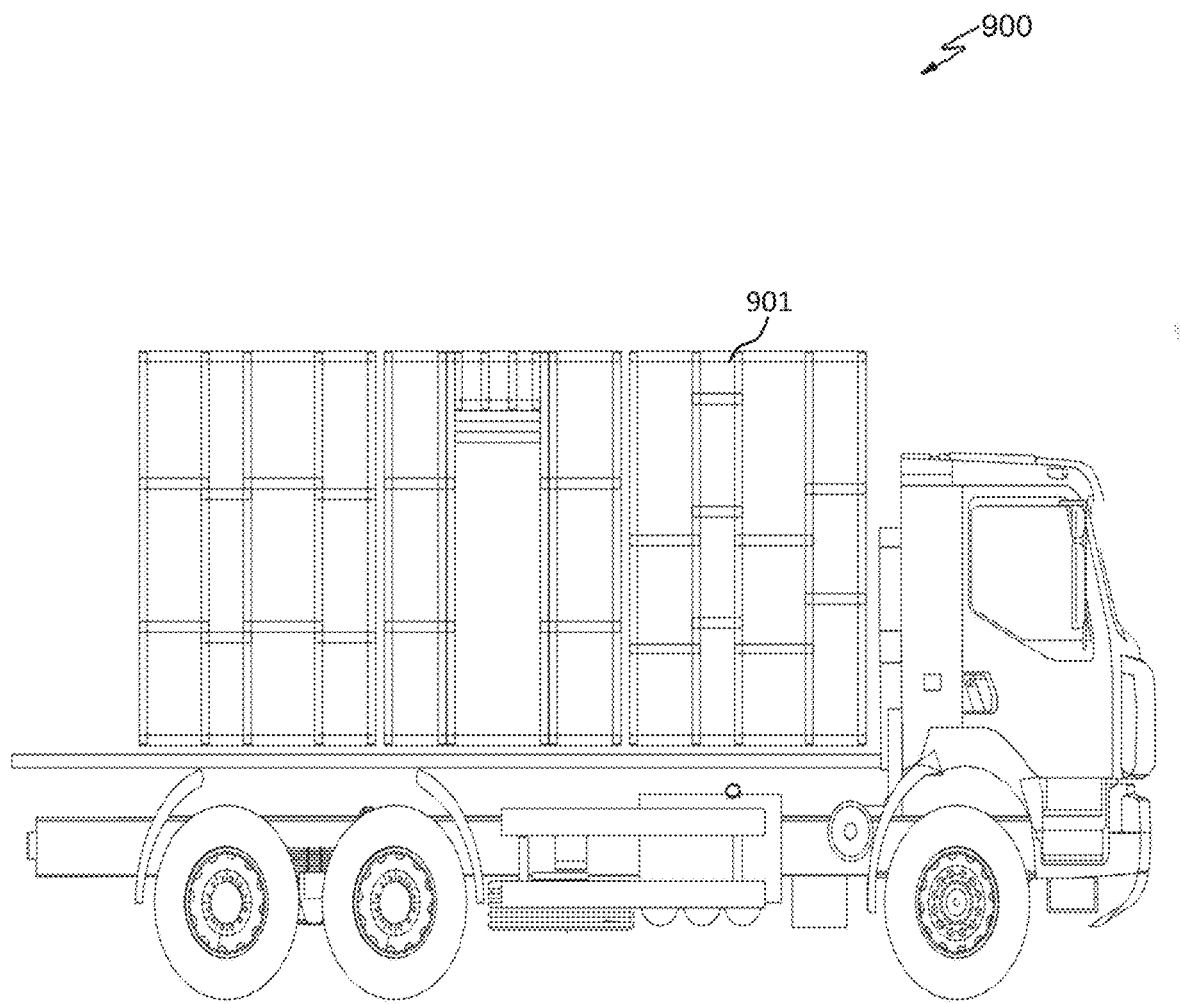
FIG. 9 depicts an illustration of the assembly on a shipping vehicle, in accordance with one embodiment of the present invention.

FIG. 9 depicts an illustration of an assembly 901 placed on a vehicle for shipping. The assembly, in this embodiment are placed on the vehicle bed. In various embodiments, the panels and thus the assembly may not form a perfect rectangle but may be designed to integrate with another assembly to create as little dead space as possible within the shipping vessel.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalent.

The invention claimed is:

1. A computer method, comprising:
analyzing, by at least one processor, a building model, wherein wall panel assemblies are isolated from other assemblies;
processing, by at least one processor, a first set of data associated with coordinates of each of the wall panel assemblies;
creating, by at least one processor, a second set of data associated with coordinates of a set of members, wherein each wall panel assembly is comprised of a set of members;
formulating, by at least one processor, an assembly process of the wall panel assemblies, wherein the assembly process is an organization of the members based on the first set of data and the second set of data;
calculating, by at least one processor, a manipulated assembly process of the wall panel assemblies based on a set of limitations, wherein the set of limitations are based on a shipping vessel;
manipulating, by at least one processor, the wall panel assemblies, wherein a manipulated wall panel assembly is created based on the set of limitations of the shipping vessel;
simulating, by at least one processor, the assembly process and the manipulated assembly process of the wall panel assemblies, based on a disassembly process of the wall panel assemblies; and
generating, by at least one processor, a graphical representation of the manipulated wall panel assembly and the wall panel assembly, wherein the graphical representation includes a procedure for the manipulated assembly process and the assembly process.

2. The computer method of claim 1, further comprising, processing, by at least one processor, the manipulated assembly of the wall panels to identify additional material to reinforce the manipulated assembly for transportation.

3. The computer method of claim 2, further comprising, generating, by at least one processor, a set of reinforcement members to integrate into the manipulated assembly.

4. The computer method of claim 3, further comprising, calculating, by at least one processor, a positioning of the set of reinforcement members.

5. The computer method of claim 4, wherein the positioning of the set of reinforcement members aligns with fastening locations of interacting wall panel members.

6. The computer method of claim 1, wherein the formulation of the assembly, further comprising, comparing, by at least one processor, a simulation to a second simulation based on a second assembly method template, and determining a preferred manipulated assembly based on the assembly process and the comparison of the simulations.

7. A computer program product for generating an assembly of a set of wall panels for shipping, the computer program product, comprising:
  one or more non-transitory computer readable storage media and program instructions stored on the one or more computer non-transitory readable storage media, the program instructions comprising:
  program instructions to analyze a building model, wherein a set of wall panels are isolated from other assemblies;
  program instructions to process a first set of data associated with the coordinates of each of the set of wall panels;
  program instructions to process a second set of data associated with an assembly process of each of the set of wall panels;
  program instructions to create a set of data associated with each of the set of wall panels and the coordinates of a set of wall panel members;
  program instructions to formulate an assembly process of each of the set of wall panels, wherein the assembly process is an organization of each of the wall panels based on the first set of data and the second set of data;
  program instructions to calculate a manipulated assembly process based on a set of limitations, wherein the limitations are based on a shipping vessel;
  program instructions to manipulate the set of wall panels, wherein the manipulated set of wall panels are limited by the shipping vessel;
  program instructions to generate a graphical representation of each of the manipulated wall panels assembly, wherein the graphical representation includes a procedure for an assembly process of each of the manipulated wall panels; and
  program instructions to simulate the assembly process of each of the set of wall panels, based on a disassembly of each of the set of wall panels.

8. The computer program product of claim 7, further comprising, program instructions to process the manipulated assembly process to identify additional material to reinforce each of the manipulated set of wall panels for transportation.

9. The computer program product of claim 8, further comprising, program instructions to generate a set of reinforcement members to integrate into the manipulated assembly.

10. The computer program product of claim 9, further comprising, program instructions to calculate positioning of the set of reinforcement members.

11. The computer program product of claim 10, wherein the positioning of the set of reinforcement members aligns with fastening locations of interacting wall panel members.

12. The computer program product of claim 7, wherein the formulation of the assembly, further comprising, program instructions to compare a simulation to a second simulation based on a second assembly method template, and determining a preferred manipulated assembly process based on the assembly process and the comparison of the simulations.

13. A system for generating an assembly of a set of wall panels for shipping, the system, comprising:
  one or more computer processors, one or more non-transitory computer readable storage media, and program instructions stored on the one or more computer non-transitory readable storage media for execution by, at least one of the one or more processors, the program instructions comprising:
  analyzing a building model, wherein wall panel assemblies are isolated from other assemblies;
  processing a first set of data associated with the coordinates of each of the wall panel assemblies;
  creating a second set of data associated with coordinates of a set of wall panel members, wherein each wall panel assembly has a set of wall panel members;
  formulating an assembly process of each of the wall panel assemblies, wherein the assembly process is an organization of the set of wall panel members based on the first set of data and the second set of data;
  calculating a manipulated assembly process based on a set of limitations, wherein the limitations are based on a shipping vessel;
  manipulating the wall panel assemblies, wherein the manipulated wall panel assemblies is within the limitations of the shipping vessel;
  processing the manipulated wall panel assemblies to identify additional material to reinforce the manipulated wall panel assemblies for transportation;
  simulating the assembly process and the manipulated assembly process of the wall panel assemblies, based on a disassembly of the wall panel assemblies; and
  generating a graphical representation of the manipulated assembly, wherein the graphical representation includes a procedure for the manipulated assembly process of each of the wall panel assemblies.

14. The system of claim 13, further comprising, generating, a set of reinforcement members to integrate into the manipulated assembly.

15. The system of claim 14, further comprising, calculating the positioning of the set of reinforcement members.

16. The system of claim 15, wherein the positioning of the set of reinforcement members aligns with the fastening locations of the interacting members.

* * * * *